US010375675B2

(12) United States Patent
Nguyen et al.

(10) Patent No.: US 10,375,675 B2
(45) Date of Patent: *Aug. 6, 2019

(54) METHOD AND SYSTEM FOR DEVICE-TO-DEVICE COMMUNICATION

(71) Applicant: NEC Corporation, Tokyo (JP)

(72) Inventors: Phong Nguyen, Victoria (AU); Pushpika Wijesinghe, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,541

(22) Filed: Apr. 3, 2018

(65) Prior Publication Data

US 2018/0227883 A1    Aug. 9, 2018

Related U.S. Application Data

(63) Continuation of application No. 15/501,734, filed as application No. PCT/JP2015/058646 on Mar. 16, 2015, now Pat. No. 9,961,671.

(51) Int. Cl.
*H04W 72/02* (2009.01)
*H04W 4/06* (2009.01)
(Continued)

(52) U.S. Cl.
CPC ............ *H04W 72/02* (2013.01); *H04W 4/06* (2013.01); *H04W 4/70* (2018.02); *H04W 8/005* (2013.01);
(Continued)

(58) Field of Classification Search
CPC ..... H04W 72/02; H04W 72/04; H04W 72/24; H04W 24/08; H04W 24/10
See application file for complete search history.

(56) References Cited

U.S. PATENT DOCUMENTS 9,247,546 B2 * 1/2016 Park .................. H04W 4/70
2013/0007073 A1 1/2013 Varma
(Continued)

FOREIGN PATENT DOCUMENTS

WO   WO-2013/067686 A1   5/2013
WO   WO-2013/107277 A1   7/2013
(Continued)

OTHER PUBLICATIONS

Alcatel-Lucent et al, "Mode 2 transmission UE for D2D communication", 3GPP TSG-RAN WG2 Meeting #85bis, R2-141659, Mar. 31-Apr. 4, 2014, 4 pages.
(Continued)

*Primary Examiner* — Michael T Vu
(74) *Attorney, Agent, or Firm* — Wilmer Cutler Pickering Hale and Dorr LLP

(57) ABSTRACT

A device-to-device user equipment (D2D-UE) and a method for use by a device-to-device user equipment (D2D-UE) is provided. The method comprises: determining, according to a non-UE specific resource allocation configuration, a plurality of available channels within a resource pool; selecting a primary channel of the plurality of available channels for the transmission of data; determining one or more transmission (TX) opportunities and one or more reception (RX) opportunities associated with the selected primary channel, wherein the transmit opportunities comprise a transmit subframe and an associated transmit resource block which are allocated for data transmission, and the reception opportunities comprise a transmit subframe which is not allocated for data transmission; transmitting a scheduling assignment (SA) on a TX opportunity of the TX opportunities; and receiving, an SA of another D2D-UE on an RX opportunity of the RX opportunities.

10 Claims, 12 Drawing Sheets

(51) Int. Cl.

| | |
|---|---|
| *H04W 8/00* | (2009.01) |
| *H04W 36/00* | (2009.01) |
| *H04W 48/16* | (2009.01) |
| *H04W 48/20* | (2009.01) |
| *H04W 52/02* | (2009.01) |
| *H04W 56/00* | (2009.01) |
| *H04W 72/04* | (2009.01) |
| *H04W 88/06* | (2009.01) |
| *H04W 4/70* | (2018.01) |
| *H04W 76/28* | (2018.01) |
| *H04W 76/27* | (2018.01) |
| *H04L 5/00* | (2006.01) |

(52) U.S. Cl.
CPC ....... *H04W 36/0066* (2013.01); *H04W 48/16* (2013.01); *H04W 48/20* (2013.01); *H04W 52/02* (2013.01); *H04W 56/001* (2013.01); *H04W 72/0406* (2013.01); *H04W 76/27* (2018.02); *H04W 76/28* (2018.02); *H04W 88/06* (2013.01); *H04L 5/0092* (2013.01); *Y02D 70/1262* (2018.01); *Y02D 70/21* (2018.01)

(56) References Cited

U.S. PATENT DOCUMENTS

| | | | |
|---|---|---|---|
| 2013/0142268 | A1 | 6/2013 | Gao et al. |
| 2013/0258996 | A1 | 10/2013 | Jung et al. |
| 2014/0036718 | A1 | 2/2014 | Gao et al. |
| 2014/0369292 | A1 | 12/2014 | Wu et al. |
| 2015/0049740 | A1 | 2/2015 | Lee et al. |
| 2015/0055579 | A1 | 2/2015 | Wu et al. |
| 2017/0012753 | A1 | 1/2017 | Kim et al. |
| 2017/0027014 | A1* | 1/2017 | Chae .................. H04W 76/14 |

FOREIGN PATENT DOCUMENTS

| | | |
|---|---|---|
| WO | WO-2013/143440 A1 | 10/2013 |
| WO | WO-2013/191522 A1 | 12/2013 |
| WO | WO-2015/166624 A1 | 11/2015 |
| WO | WO-2015/170944 A1 | 11/2015 |

OTHER PUBLICATIONS

Alcatel-Lucent Shanghai Bell and Alcatel-Lucent, "Resource allocation for scheduling assignment," 3GPP TSG RAN WG1 Meeting #77, R1-142056, Seoul, Korea, May 19-23, 2014 (4 pages).

Alcatel-Lucent Shanghai Bell et al., "Resource allocation for D2D broadcast communication" 3GPP TSG RAN WG1 Meeting #77; R1-142055, May 19-23, 2014, 5 pages.

Alcatel-Lucent Shanghai Bell et al., "Resource allocation for scheduling assignment", 3GPP TSG RAN WG1 Meeting #77, R1-142574, May 19-23, 2014, 7 pages.

ASUSTeK, "D2D communication resource scheduling", 3GPP TSG RAN WG1 Meeting #76bis, R1-141576, Mar. 31-Apr. 4, 2014, 3 pages.

Australian Examination Report issued by the Australian Government for Australian Application No. 2015300551 dated Jan. 22, 2018 (12 pages).

Catt, "Data transmission in D2D communication" 3GPP TSG RAN WG1 Meeting #77; R1-141998, May 19-23, 2014, 4 pages.

Ericsson, "On resource allocation for communication in Mode 1 and Mode 2" 3GPP TSG-RAN WG1 Meeting #77, R1-142402; May 19-23, 2014, 5 pages.

Ericsson, "On scheduling assignments" 3GPP TSG-RAN WG1 Meeting #77, R1-142400, May 19-23, 2014, 2 pages.

Intel Corporation, "Distributed Resource Allocation for D2D Communications" 3GPP TSG RAN WG1 Meeting #77; R1-142016, May 19-23, 2014, 8 pages.

Intel Corporation, eNB Controlled Resourse Allocation for D2D Communication 3GPP TSG RAN WG1 Meeting #77; R1-142017, May 19-23, 2014, 6 pages.

International Search Report corresponding to PCT/JP2015/058646, 4 pages, dated Nov. 6, 2015.

LG Electronics, "Discussion on Signaling for D2D Communication Resource Allocation", 3GPP TSG RAN WG1 Meeting #77, R1-142147, May 19-23, 2014, 8 pages.

LG Electronics, "Resource allocation mode 2 in D2D communication" 3GPP TSG RAN WG1 Meeting #77; R1-142148, May 19-23, 2014, 6 pages.

LG Electronics, "Scheduling of D2D transmissions for D2D Communication". 3GPP TSG-RAN WG2 #86, R2-142433, May 19-23, 2014, 3 pages.

Samsung, "Collision avoidance mechanism for D2D broadcast communication", 3GPP TSG RAN WG1 Meeting #76bis, R1-141747, Mar. 31-Apr. 4, 2014, 5 pages.

Fujitsu "Further Analysis on Control Signal and Scheduling Assignment for D2D Communication", 3GPP TSG-RAN1#77, R1-142070, Seoul, Korea, May 19-23, 2014, pp. 1-5 (5 pages).

Japanese Notification of Reasons for Refusal issued in Japanese Patent Application No. 2017-506809, dated Nov. 20, 2018, 7 pages.

Australian Examination Report No. 3 issued in Australian Patent Application No. 2015300551, dated Jan. 4, 2019, pp. 1-5 (5 pages).

Examination Report issued by the Australian Goverment IP for Australian Application No. 2015300551 dated Sep. 19, 2018 (10 pages).

* cited by examiner

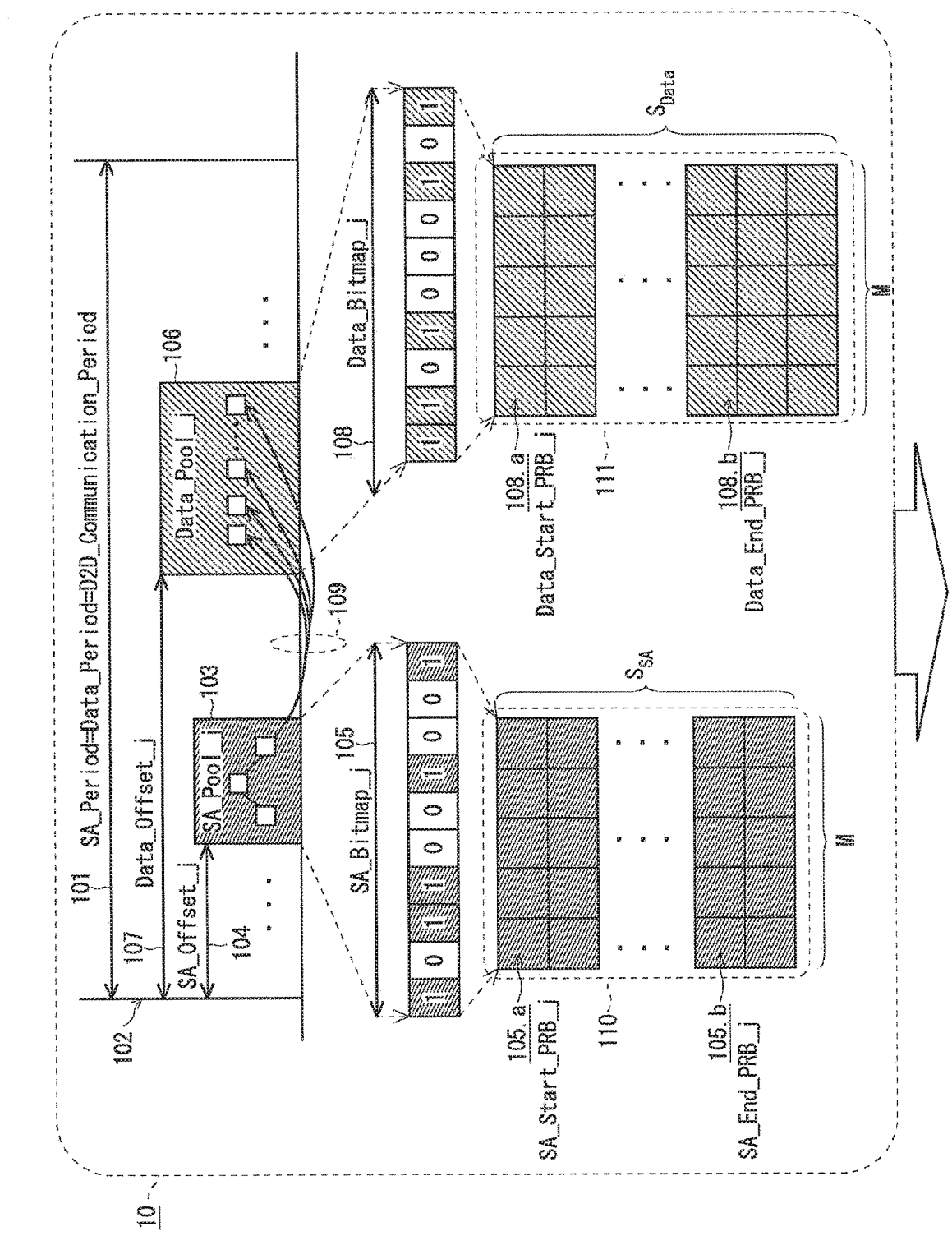

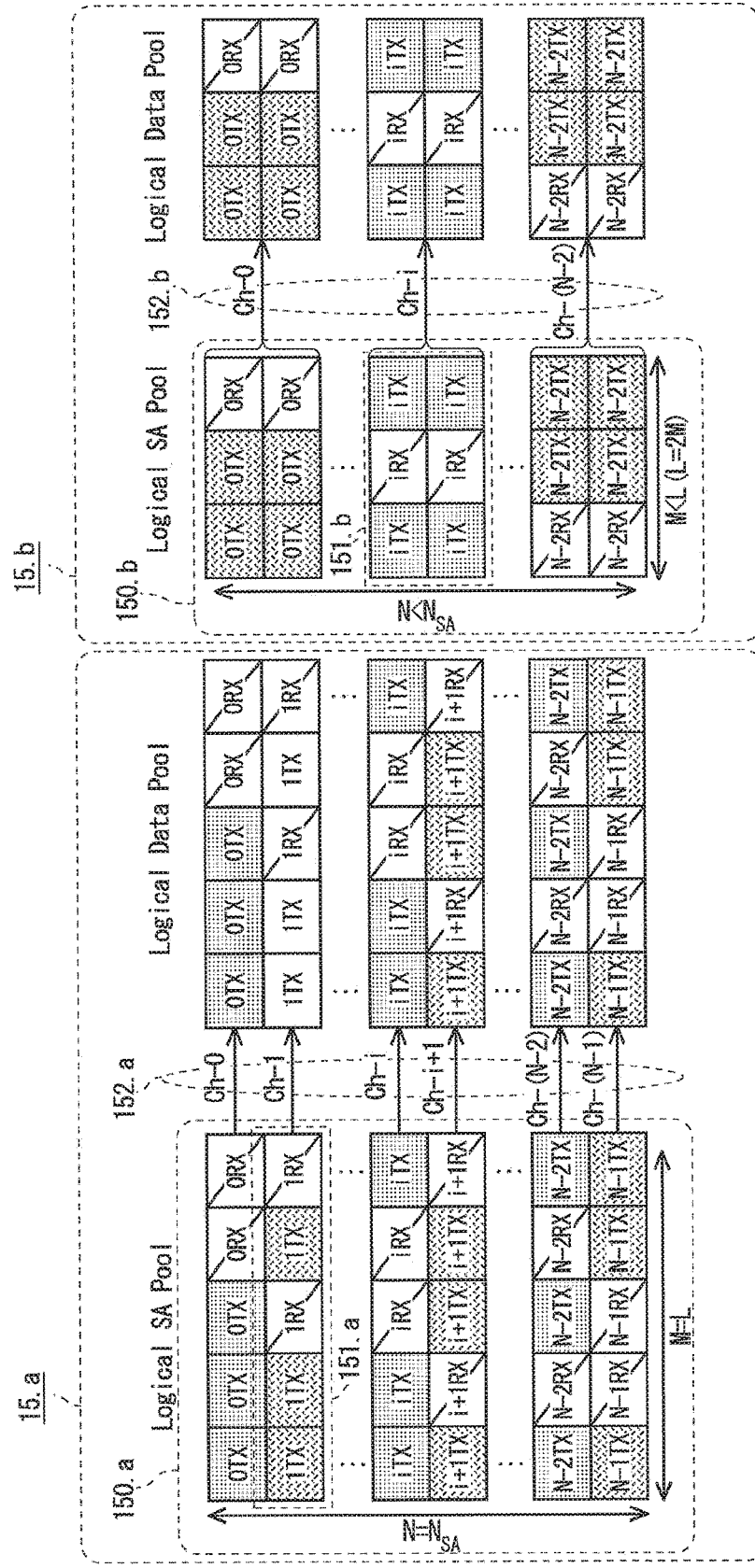

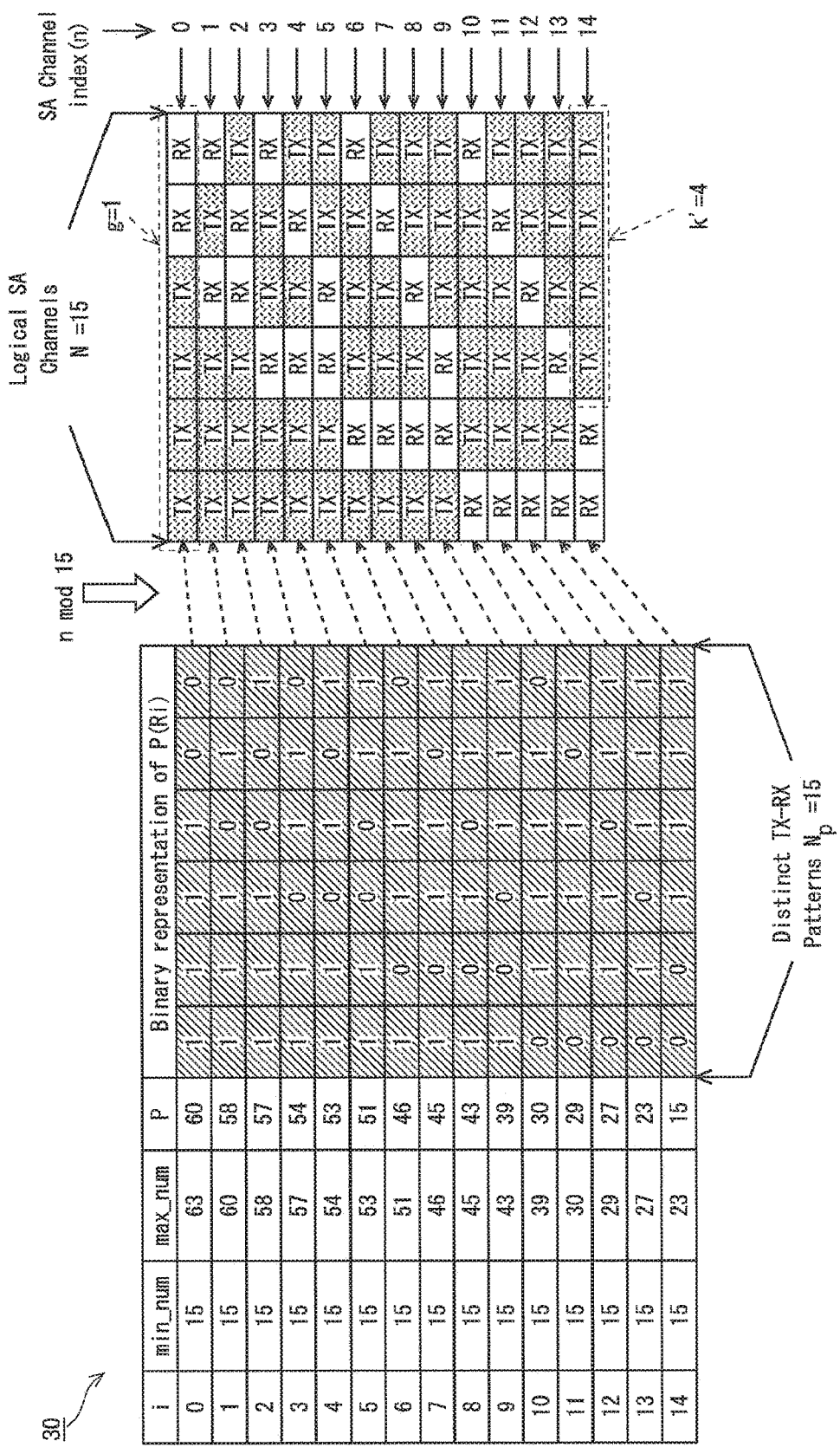

METHOD AND SYSTEM FOR DEVICE-TO-DEVICE COMMUNICATION

CROSS-REFERENCE TO RELATED APPLICATIONS

This application is a Continuation Application of application Ser. No. 15/501,734 filed on Feb. 3, 2017 which claims priority to International Application No. PCT/JP2015/058646 entitled "METHOD AND SYSTEM FOR DEVICE-TO-DEVICE COMMUNICATION," filed on Mar. 16, 2015, which claims the benefit of the priority of Australian Patent Application No. 2014903048 filed on Aug. 6, 2014, the disclosures of each of which are hereby incorporated by reference in their entirety.

TECHNICAL FIELD

The present invention relates to device-to-device (D2D) advanced wireless communication.

BACKGROUND ART

The following abbreviations are used herein:

| | |
|---|---|
| 3GPP | $3^{rd}$ Generation Partnership Project |
| D2D | Device-to-Device Communication |
| D2D-UE or DUE | Cellular User equipment with direct communication capability |
| eNodeB | Evolved NodeB |
| ePDCCH | enhanced Physical Downlink Control Channel |
| FDD | Frequency Division Duplex |
| LTE | Long Term Evolution |
| MAC PDU | Medium Access Control Protocol Data Unit |
| PDCCH | Physical Downlink Control Channel |
| RB | Resource Block |
| RX | Receive |
| SA | Scheduling Assignment |
| SIB | System Information Broadcast |
| TB | Transport Block |
| TDD | Time Division Duplex |
| T-RPT | Time Resource Pattern of Transmission |
| TX | Transmit |
| UE | User Equipment |

Recent advancements in the field of cellular communication include providing support for direct communication between mobile devices in the licensed spectrum. This is widely known as device-to-device (D2D) communication. This has largely been motivated by the popularity of proximity based services steered by social networking applications as well as public safety. D2D communication has several advantages including, but not limited to, improving overall spectral efficiency, improving local coverage, facilitating traffic offloading from a cellular network, and enabling various types of new services and applications.

The 3rd Generation Partnership Project (3GPP) has been working towards including D2D communication feature as an overlay to its existing Long Term Evolution (LTE) cellular network. 3GPP has a target of providing the major functionality needed to support public safety communication in to its upcoming Release 12 standards and beyond. Under this goal, two functionalities, namely, broadcast communication in and out-of network coverage, and device discovery under network coverage, have been prioritised. Current progress on D2D broadcast communication includes the definition of two communication modes, namely Mode-1 and Mode-2.

In Mode-1 broadcast communication, an eNodeB or rel-10 relay node schedules the exact resources used by a UE to transmit direct data and direct control information. In particular, the eNodeB or Rel-10 relay allocates resources to a D2D transmitter for D2D control information or scheduling assignment (SA) transmission and corresponding D2D Data transmission using PDCCH or ePDCCH. This enables collision free multi-user access.

In contrast, in Mode-2 communication, a D2D-UE selects resources from common resource pools to transmit direct data and direct control information or SA. Mode-2 communication can be operated under network coverage or out-of-network coverage. However, in both scenarios, resource selection for SA and data transmission is performed by the UE without a central coordination. Thus, D2D-UEs performing mode-2 communication have to contend with each other to acquire resources in resource pool for SA and corresponding data transmission, which creates a contention-based multiple access environment with collisions for mode-2 communication.

According to the current progress of 3GPP on resource allocation for mode-2 communication, it is envisioned that the resource pools for SA and data transmission will be pre-configured or semi-statistically allocated. The D2D-UEs may follow a time-domain transmission pattern (TX-RX pattern), or a so called time resource pattern of transmission (T-RPT), within the resource pools to transmit SA and associating data transport blocks (TBs), and repetitions thereof. The objective of TX-RX patterns or T-RPT is to minimise the half-duplex constraint and minimise in-band emission while enabling the receiver combining to improve detection performance. However, the design of the resource pool configuration, channel structure within resource pools and TX-RX patterns is complex and has not been defined.

Channel sensing based resource selection and random resource selection have been considered as two candidates for resource selection in mode-2 communication. However, implementation of channel sensing based resource selection in a multiple channel environment is very complex. It is therefore envisioned that a random resource selection will be the baseline for mode-2 broadcast communication. However, the design of SA and data transmission using random resource selection is complex and has not been defined.

Accordingly, while the design of the resource pool configuration has been considered in 3GPP, there are currently no suitable resource selection methods for mode-2 communication. Accordingly, there is a need for an improved method and system for configuring D2D communication.

It will be clearly understood that, if a prior art publication is referred to herein, this reference does not constitute an admission that the publication forms part of the common general knowledge in the art in Australia or in any other country.

SUMMARY OF INVENTION

Technical Problem

The present invention is directed to control signalling in advanced wireless communication networks, which may at least partially overcome at least one of the abovementioned disadvantages or provide the consumer with a useful or commercial choice.

Solution to Problem

With the foregoing in view, the present invention in one form, resides broadly in a method for use by a device-to-device user equipment (D2D-UE), the method comprising:

determining, according to a non-UE specific resource allocation configuration, a plurality of available channels within a resource pool;

selecting a primary channel of the plurality of available channels for transmission of data;

determining one or more transmission (TX) opportunities and one or more reception (RX) opportunities associated with the selected primary channel, wherein the transmit opportunities comprise a transmit subframe and an associated transmit resource block which are allocated for transmission of data, and the reception opportunities comprise a transmit subframe which is not allocated for transmission of data;

transmitting a scheduling assignment (SA) on a TX opportunity of the TX opportunities; and receiving, an SA of another D2D-UE on an RX opportunity of the RX opportunities.

Embodiments of the present invention provide a method to partition a configured or preconfigured non-UE specific resource pool into logical channels according to configured or preconfigured system parameters. Each partitioned channel comprises a unique TX-RX pattern such that each pattern has at least one opportunity to monitor/listen to all other patterns for SA and/or pre-emption requests, thus reducing the half-duplex constraint and in-band emission and is uniquely indexed for self-derivation at a D2D-UE.

The method may further comprise: receiving, at the D2D-UE, the non-UE specific resource allocation configuration.

The non-UE specific resource allocation configuration may be preconfigured. This may be desirable for use by D2D-UEs out of network coverage.

The resource pool may include at least one of: an SA pool; and an associated data pool.

The step of determining the one or more TX subframes may be performed at least partly according to a transmission-reception (TX-RX) pattern, wherein the non-UE specific resource allocation configuration includes a TX-RX pattern length, defining a length of the TX-RX pattern, and a number of TX opportunities associated with the TX-RX pattern. The TX-RX pattern may ensure that a minimum number of RX opportunities are left for the D2D-UE to listen to/monitor others transmissions.

The step of determining the plurality of available channels within the resource pool may comprise:

determining a number of scheduling assignment resource blocks (SA-RBs) $N_{SA}$ as:

$$N_{SA} = \left\lfloor \frac{S_{SA}}{x} \right\rfloor,$$

where $S_{SA}$ is a number of LTE-RBs in the resource pool and x is a number of LTE-RBs used to transmit a scheduling assignment (SA);

determining a number of possible SA channels N in the resource pool as:

$$N = \left\lfloor \frac{N_{SA}}{g} \right\rfloor,$$

where $$g = \left\lceil \frac{L}{M} \right\rceil$$

is a number of SA-RBs per SA channel, L is a length of the TX-RX pattern and M is a number of subframes in the resource pool; and determining a number of time-domain 'TX' opportunities per TX-RX pattern k' as:

$$k' = \left\lceil \frac{k}{g} \right\rceil,$$

where k is a number of repetitions per SA transmission.

The step of determining the plurality of available channels within a resource pool may further comprise indexing a plurality of distinct TX-RX patterns $N_p$ corresponding to the plurality of available channels by:

ordering the TX-RX patterns according to a binary representation of each TX-RX pattern, wherein a TX opportunity is represented as a binary '1' and an RX opportunity is represented as a binary '0' and wherein each TX-RX pattern has k'≤k number of TX opportunities and (L−k') RX opportunities.

The step of determining the plurality of available channels within a resource pool may further comprise indexing a plurality of distinct TX-RX patterns $N_p$ corresponding to the plurality of available channels according to a look-up table, wherein the lookup table comprises a channel matrix C of size (N×g) rows and M columns, wherein the p-th TX-RX pattern corresponds to the (gn+h)-th row of the matrix C where p=n mod $N_p$, n is the channel index with 0≤n<N, and h is the SA-RB number of the n-th channel.

The method may further comprise:

contending for the primary channel for SA transmission and SA repetition(s) transmission that provides layer-1 control information for the reception of a single transport block (TB) carrying one or more voice or data frames.

The method may further comprise:

contending for multiple channels for SA transmission and SA repetition transmission that provide layer-1 control information for the reception of multiple transport blocks (TBs) carrying one or more voice or data frames.

The step of contending for the multiple channels may further comprise:

selecting a secondary channel of the plurality of available channels for the transmission of data;

transmitting a pre-emption request for the selected secondary channel on a subframe of the selected secondary channel, wherein the subframe of the selected secondary channel is an RX opportunity, and a corresponding subframe on the selected primary channel is a TX opportunity; and monitoring a subframe of the selected secondary channel, where a corresponding subframe on the selected primary channel is an RX opportunity.

Embodiments of the present invention provide an efficient method to perform D2D broadcast communication with contention access. In particular, embodiments of the invention provide an ability to allow a D2D-UE performing multiple data TBs transmission within a single D2D communication cycle using a single scheduling assignment that conveys scheduling information and layer-1 control information for multiple TBs reception and pre-emption request transmission to acquire an additional data channel and hence reduce data TB collisions.

The secondary channel may be selected such that an RX opportunity of the secondary channel occurs prior to a latest RX opportunity of the selected primary channel.

The pre-emption request may comprise a duplication of the SA transmitted on the selected primary channel.

The method may further comprise:

if the pre-emption request on the selected secondary channel is transmitted before an RX opportunity on the primary SA channel:

transmitting the SA at the TX opportunities of the selected primary channel and duplication of the SA at the pre-emption request opportunity on the selected secondary channel;

monitoring the secondary channel at the first RX opportunity on the selected primary channel; and transmitting the SA at all TX opportunities of the selected primary channel after the pre-emption request; and if the pre-emption request on the selected secondary channel is transmitted after an RX opportunity on the primary SA channel:

transmitting the SA at all TX opportunities of the selected primary channel before the pre-emption request;

monitoring the secondary channel at the RX opportunities on the selected primary channel that occur before the pre-emption request;

transmitting the SA on the primary channel and duplication of the SA on the secondary channel at the pre-emption request opportunity of the secondary channel; and transmitting the SA at all TX opportunities of the selected primary channel after the pre-emption request.

The method may further comprise:

detecting an SA of another D2D-UE on the secondary channel; and in response to detecting the SA, transmitting data on data resources corresponding to the pre-emption opportunities of the secondary channel, and not transmitting data on other data resources of the secondary channel.

The method may further comprise:

transmitting data on data resources corresponding to the secondary SA channel according to the TX opportunities of the primary channel's TX-RX pattern, when an SA of another D2D-UE is not detected on the secondary channel.

The method may further comprise receiving a pre-emption request on the selected channel in direct mode or group communication.

The received pre-emption request comprises a request for the primary channel by a second D2D-UE.

The first D2D-UE may be acting as a master in managing channel resource in a direct mode communication. The second D2D-UE may be acting as a slave in requesting channel resource it needs for its voice/data frame transmission in direct mode communication.

Embodiments of the invention provide an efficient method in direct communication especially in group communication in public safety such as "Push to Talk" where there is a master who controls communication channel(s) and perform voice/data frames transmission where others are slaves who potentially perform voice/data frames reception and may transmit pre-emption request to acquire channel from the master for their voice/data frames transmission.

In another form, the invention resides in a device-to-device user equipment (D2D-UE) including:

an antenna;

a processor coupled to the receiver; and a memory coupled to the processor, the memory including instruction code executable by the processor for:

determining, according to a non-UE specific resource allocation configuration, a plurality of available channels within a resource pool;

selecting a primary channel of the plurality of available channels for the transmission of data;

determining one or more transmission (TX) opportunities and one or more reception (RX) opportunities associated with the selected primary channel, wherein the transmit opportunities comprise a transmit subframe and an associated transmit resource block which are allocated for data transmission, and the reception opportunities comprise a transmit subframe which is not allocated for data transmission;

transmitting, on the antenna, a scheduling assignment (SA) on a TX opportunity of the TX opportunities; and receiving, on the antenna, an SA of another D2D-UE on an RX opportunity of the RX opportunities.

Certain embodiments of the present invention provide methods for transmitting or broadcasting voice and/or data frames in Device-to-Device (i.e. D2D) communication system where more than one D2D-communication capable user equipment (i.e. D2D-UEs) may contend to acquire resources or channels from a set of non-UE specific resources (e.g. a resource pool).

Advantageous Effects of Invention

According to the certain embodiments, a superset of resource pools for reception of control frame(s) (or so call scheduling assignment (SA) in 3GPP terminology) and associating voice/data frame(s) within a configurable or predefined period may be commonly understood by all D2D-UEs which are in or out of their respective cellular network coverage. Based on neighbouring cells configuration and requirement for time/frequency domain interference management, a serving cellular base station (e.g. an eNB) may select and configure one or more resource pool(s) out of the reference superset in a period for transmission of control frame(s) (i.e. SA) and associating voice/data frame(s) by D2D-UE(s) in D2D communication within its geographical coverage.

According to certain embodiments, a resource pool with dimension {number of subframes, number of PRBs} is configured or preconfigured for SA transmission and partitioned into one or more channels. Each channel is used for the mapping of physical channels carrying SA and SA repetitions. Each partitioned channel comprises a set of {subframe numbers, PRB numbers} forming a unique TX-RX pattern, and is uniquely indexed. Once a D2D-UE has selected a channel index for transmitting its SA and SA repetitions, it can transparently derive the pattern of {subframe number(s), PRB number(s)} that it is allowed to transmit its SA and SA repetitions, and the subframe number(s) that on which it should only perform reception.

According to certain embodiments, the present invention enables D2D-UEs that select different channel indices for transmitting their SA and SA repetitions in an SA pool to listen to each other's transmission in subframe(s) reserved for SA reception.

Certain embodiments of the present invention further provides a method to a D2D-UE in transmitting pre-emption request(s) on {subframe number(s), PRB number(s)} reserved for SA reception of a uniquely indexed channel for acquiring that occupied channel.

According to certain embodiments, a D2D-UE may perform contention for transmitting its SA and SA repetitions, by providing layer-1 control information for a later transport block (TB) reception on a particular configured or preconfigured SA pool. A channel index may be randomly selected within the allowed channel indices range, or derived from a unique identifier (ID) such as a user equipment identifier (UE-ID).

On the selected or derived channel index, the D2D-UE may further derive a pattern of subframes within the SA pool that it is allowed to perform transmission or reception. On the subframes that it is allowed to perform transmission, the D2D-UE further derives PRB numbers on which it is allowed to map its physical channel carrying its SA or its SA repetition. On the subframes that the D2D-UE is restricted to reception, the said D2D-UE may attempt to detect SAs on PRBs of other channels and may also attempt to detect pre-emption request on PRBs of its selected channel. Once a pre-emption request is detected, the D2D-UE may decide to give up the data channel in the data pool corresponding to its selected channel in the current SA pool and/or future SA/data pool(s). Once it has decided to give up its data channel, it may stop transmitting its SA or SA repetitions in the future remaining coming subframe(s).

According to yet further embodiments, a D2D-UE may perform contention for transmitting its SA and SA repetitions in a particular configured or preconfigured SA pool, providing layer-1 control information for the reception of more than one transport blocks (TBs) transmission in the corresponding data pool, by:
a) selecting the primary channel index that will be used for transmitting full SA and SA repetitions, providing layer-1 control information for the reception of its multiple transport blocks in the corresponding data pool,
b) selecting one or more secondary channel indices for transmitting its pre-emption(s) requesting acquisition of the corresponding data channel(s). It is preferable that secondary channel index(s) will be selected among channel indices pool that has reception subframe(s) occurs prior to the latest reception subframe of its selected primary channel,
c) on the subframe(s), that SA or SA repetition transmission is allowed on its primary channel PRB and only reception is allowed on its selected secondary channel(s), the said D2D-UE shall map its SA or SA repetition on its primary channel PRB as usual and map its pre-emption request(s) on its secondary channel(s) PRB,
d) on the subframe(s), that it is restricted to reception on its selected primary channel, the said D2D-UE shall monitor its secondary channel(s) PRB(s) for a SA or SA repetition from other D2D-UE(s).

If there is no SA or SA repetition detected on its secondary channel(s) PRB(s), the said D2D-UE may assume that the selected secondary channel(s) is free and therefore it will fully occupy the corresponding data channel in the corresponding data pool for transmission of its full secondary TB and secondary TB repetitions or redundancies.

Else, the said D2D-UE may assume that the selected secondary channel(s) is occupied and its pre-emption request was unsuccessful. Therefore, in order to avoid collision with the currently occupying D2D-UE, the said D2D-UE may not transmit its secondary TB and secondary TB repetitions on the corresponding secondary data channel or it may only transmit its secondary TB in the PRB(s) on the corresponding secondary data channel that will not be used by the occupying D2D-UE for transmission.

Thus, certain embodiments of the present invention disclose methods to partition a resource pool into channel for mapping of physical channels carrying SA and data transmission in Mode-2 broadcast communication, and method to uniquely index TX-RX patterns and associate them to the physical channels in the resource pools.

Embodiments of the invention further disclose methods to perform SA and data TB transmission that enables scheduling of multiple TB transmission through a single SA (with repetitions) via physical layer pre-emptions for acquiring multiple data channels.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2A illustrates a non-UE specific resource allocation configuration, for device-to-device (D2D) broadcast communication, according to an embodiment of the present invention;

FIG. 2B illustrates a non-UE specific resource allocation configuration, for device-to-device (D2D) broadcast communication, according to an embodiment of the present invention;

FIG. 4A illustrates exemplary scenarios of SA pattern indexing and association of SA patterns to SA channels, according to embodiments of the present invention;

DESCRIPTION OF EMBODIMENTS

Figure 1:
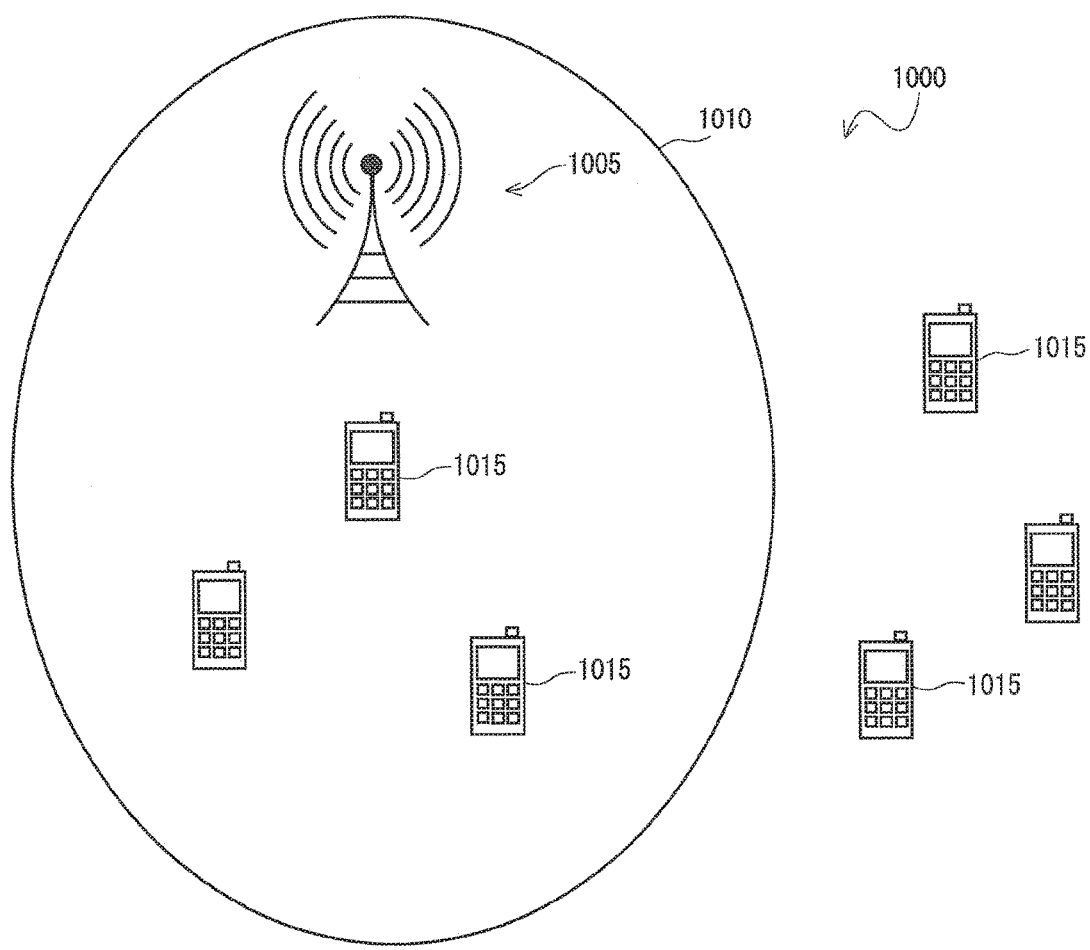
FIG. 1 is a schematic diagram illustrating a wireless communication system, according to an embodiment of the present invention.

FIG. 1 is a schematic diagram illustrating a wireless communication system 1000, according to an embodiment of the present invention. The wireless communication system 1000 enables D2D communication, as discussed in further detail below.

The wireless communication system 1000 is a typical single cell cellular network comprising an access node 1005 representing a cellular base station providing a coverage area 1010 and services to plurality of device-to-device user equipments (D2D-UEs) 1015. The access node 101 can be an FDD or a TDD access node.

Among the plurality of D2D-UEs 1015, there is more than one D2D-UE 1015 that is within the coverage area 1010, and more than one D2D-UE 1015 that is outside of the coverage area 1010.

As discussed in further detail below, embodiments of the present invention provide methods of partitioning configured or pre-configured non-UE specific resources (e.g. a resource pool) into channels. The channels may be used for mapping physical channels transmitted by the D2D-UEs 1015 in D2D broadcast, group-cast, and direct mode communication, where D2D-UEs contend to acquire resources for transmitting of SA and associating voice/data frames/transport blocks. The methods may be performed within the coverage area 1010, or outside of the coverage area 1010.

Furthermore, embodiments of the present invention provide methods for indexing logical channel(s) corresponding to unique time-domain transmission pattern(s) (TX-RX patterns) according to a network configured or preconfigured parameters and resource pool size. Each uniquely indexed channel is transparent to any receiver for self-derivation of TX-RX patterns, and each unique TX-RX pattern has at least one opportunity to monitor/listen to all other transmission patterns for SA and/or pre-emption request.

Yet further again, embodiments of the present invention provide methods for performing D2D broadcast communication with the ability to transmit multiple data transport blocks within a single D2D communication cycle/period through physical layer pre-emption to acquire an occupied channel or channels and to minimize data collisions.

FIGS. 2A and 2B illustrate a non-UE specific resource allocation configuration 10, for device-to-device (D2D) broadcast communication, according to an embodiment of the present invention.

The configuration 10 may be repeated periodically, and broadcasted to the D2D-UEs 1015 within the coverage 1010 of the base station 1005 by a system information broadcast (D2D-SIB) message. For D2D-UEs that are out of coverage, such as the D2D-UEs 1015 outside of the coverage 1010 of the base station 1005, a super set of pre-configured non-UE specific resource allocation configurations may be used.

The resource allocation configuration 10 may have a periodicity specified by a 'D2D_Communication_Period' 101 that may start from an LTE system frame boundary 102. Within the D2D_Communication_Period 101 there may be one or more first type resource pools in the form of 'SA Pools' 103, which comprise time and frequency resources that point to the location of data and contain information required for the reception and decoding of said data.

A location of a j-th SA Pool 103 within the D2D_Communication_Period 101 may be specified according to an 'SA_period', which defines a periodicity of the SA Pool 103, an 'SA_Offset_j' 104, which specifies an offset of the j-th SA Pool 103 from a radio frame boundary at which the SA_Period starts, and an 'SA_Bitmap_j' 105, which specifies the subframes that are reserved for the SA Pool 103. According to certain embodiments, the SA_period is equal to the D2D_Communication_Period 101.

The configuration 10 may further include one or more second type resource pools in the form of 'Data Pools' 106, reserved for voice or data transport block (TB) or MAC-PDU transmission. The j-th Data Pool 106 may have a periodicity specified by a 'Data_Period', which defines a periodicity of the Data Pool 106, a 'Data_Offset_j' 107, which specifies an offset of the j-th Data Pool 106 from the radio frame boundary at which the Data_Period starts, and a bitmap called 'Data_Bitmap_j' 108' that specifies the subframes that are reserved for Data Pool 106. The 'Data_Period' may be equal to the D2D_Communication_Period 101.

Within a single D2D_Communication_Period 101, each SA Pool 103 is associated with a Data Pool 106 (and any such repetitions if so configured), as illustrated by association 109, such that the j-th SA Pool 103 carries scheduling assignments (SAs) for the data TBs transmitted in the j-th Data Pool 106.

Multiple subframes M make-up the jth SA Pool 103 in the time-domain, as defined by SA_Bitmap_j 105. Furthermore, the jth SA Pool 103 may be made up of multiple LTE resource blocks (LTE-RBs) in the frequency-domain, specified by 'SA_Start_PRB_j' 105.a and 'SA_End_PRB_j' 105.b. As such, the jth SA Pool 103 comprises a physical SA Pool 110 of size M subframes by $S_{SA}$ LTE-RBs.

Similarly, multiple subframes M make-up the j-th Data Pool 106 in time-domain, specified by Data_Bitmap_j 108. Furthermore, the j-th Data Pool 106 may be made up of multiple LTE-RBs in the frequency-domain, specified by 'Data_Start_PRB_j 108.a' and 'Data_End_PRB_j 108.b'. This results in the j-th Data Pool 106 having a physical Data Pool 111 of size M subframes by $S_{Data}$ LTE-RBs.

For the sake of clarity, in the forthcoming descriptions, the j-th SA Pool 103 and j-th Data Pool 106 are referred to as the SA Pool and the Data Pool, respectively.

A single SA transmission may occupy x LTE-RBs over one subframe, where the value of x is configurable or fixed. Thus, the number of frequency-multiplexed SA resources or concurrent SA transmissions, i.e. the number of SA-RBs ($N_{SA}$), in a single subframe of the SA Pool 103 is defined by $$N_{SA} = \left\lfloor \frac{S_{SA}}{x} \right\rfloor.$$

In such case, one SA-RB comprises x number of LTE-RBs over one subframe to transmit a single instance of the SA. This results in a logical SA Pool (150.a in schematic 15.a and 150.b in schematic 15.b) of size M subframes in time-domain and $N_{SA}$ SA-RBs in frequency domain.

In order to improve SA detection performance, the SA may be repeated k times (including an initial transmission), in different time and frequency resources within a single SA Pool. As D2D-UEs may be half-duplex, they may not be able to perform signal reception while performing signal transmission. Therefore, the SA may be repeated in a manner that maximises the reception of SAs from other D2D-UEs during an SA_period.

As such, time-domain transmission patterns (TX-RX patterns) for SA transmission have been designed such that a D2D-UE applying a TX-RX pattern may transmit a SA during subframes marked as 'TX' (TX opportunities) and may receive SAs from other D2D-UEs during the subframes marked as 'RX' (RX opportunities).

Accordingly, a TX-RX pattern may be configured or pre-configured to have a pattern length 'L' to occupy the k number of TX opportunities required per SA transmission and leave (L−k) number of RX opportunities to listen to/monitor others transmission, where the value of L≥M may be configured by the network or fixed in the specification or obtained by the values of M and k as $$L = \left\lceil \frac{k}{M} \right\rceil \times M \text{ for } k \neq M.$$

The number of distinct TX-RX patterns possible within a given SA Pool may depend on the SA pool size ($M \times N_{SA}$), and a number of repetitions per SA (k). As such, a number of simultaneous users that can be accommodated within the SA Pool without TX-RX pattern collision/overlap may depend on the total number of distinct TX-RX patterns in the SA Pool.

In one embodiment, a serving base station is able to allocate M subframes for the SA pool such that M is large enough to accommodate all k repetitions of the SA transmission in a time-multiplexed manner, while having a sufficient number of distinct TX-RX patterns (or sufficient number of subframes for 'RX' opportunities) to facilitate multi-user access. In such situation, as illustrated in the schematic 15.a of FIGS. 2A and 2B, the pattern length L can be equal to the number of subframes M in the SA Pool, and one TX-RX pattern can be associated to a SA channel (such as 151.a) that occupies one SA-RB in the frequency domain and M=L subframes in time-domain.

In another embodiment, a serving base station may not be able to allocate a sufficient number of subframes M to accommodate all k repetitions of the SA in a time-multiplexed manner, while having a sufficient number of distinct TX-RX patterns to facilitate multi-user access. In such situation, as illustrated in the schematic 15.b of FIGS. 2A and 2B, the pattern length L can be an integer (g,g>0) multiple of the number of subframes m in the SA Pool such that the k repetitions are transmitted in time-frequency multiplexed manner. One TX-RX pattern in such situation can be associated to a SA channel (such as 151.b) that occupies $$g = \left\lceil \frac{L}{M} \right\rceil$$

SA-RBs in the frequency domain and M subframes in the time-domain. These situations may further result in the number of SA channels (N) possible for a given SA Pool being equal to (as in 15.a) or less than (as in 15.b) $N_{SA}$, depending on the configured values of M, $S_{SA}$, x, k and L.

As mentioned above, a single SA (including repetitions) transmitted in a SA Pool may point to a location of an associated Data TB (including repetitions) in a corresponding Data Pool. Signalling overhead in the SA transmission can be considerably reduced by implicit signalling, if the SA channels in the SA Pool are linked with the Data channels in the Data Pool using a pre-defined association rule. Furthermore, a pre-defined linkage between SA channels and Data channels may require contention access only for SA channel acquisition (once the SA channel is acquired the associated data channel is also acquired), simplifying the collision scenarios in distributed channel access for D2D broadcast communication.

Thus, embodiments of the present invention utilise a one-to-one association of SA channels in an SA Pool to Data channels in a corresponding Data Pool (as in 152.a and 152.b of FIGS. 2A and 2B) such that the SA channel index in the SA Pool implicitly signals the data resources in the associated Data Pool, and the TX-RX pattern applied to the i-th SA channel is also applied to the i-th Data channel.

As such, the network configured or pre-configured physical resource pools for D2D broadcast communication are structured into multiple channels, which are in turn associated with properly indexed TX-RX patterns to allow multi-user access and to reduce the half duplex constraint of D2D devices.

Thus, embodiments of the invention provide a method to partition a configured or pre-configured resource pool, to uniquely index all possible TX-RX patterns within a configured resource pool and associate TX-RX patterns to partitioned resources in the resource pool such that TX-RX opportunities are transparent across all channels and D2D-UEs.

Transparency of TX-RX patterns means that there exists associated physical resources for both 'TX' and 'RX' opportunities (not only for TX opportunities) of a given TX-RX pattern forming a physical channel that is identified by a channel index n, $0 \leq n < N$. The allocation of physical resources for RX opportunities may facilitate including enhanced features such as pre-emption access to the distributed channel access mechanism as described in another novel aspect of the present invention.

It should be noted that the below description relates to an SA Pool, however, the methods may be applied to a Data Pool.

Figure 3A:
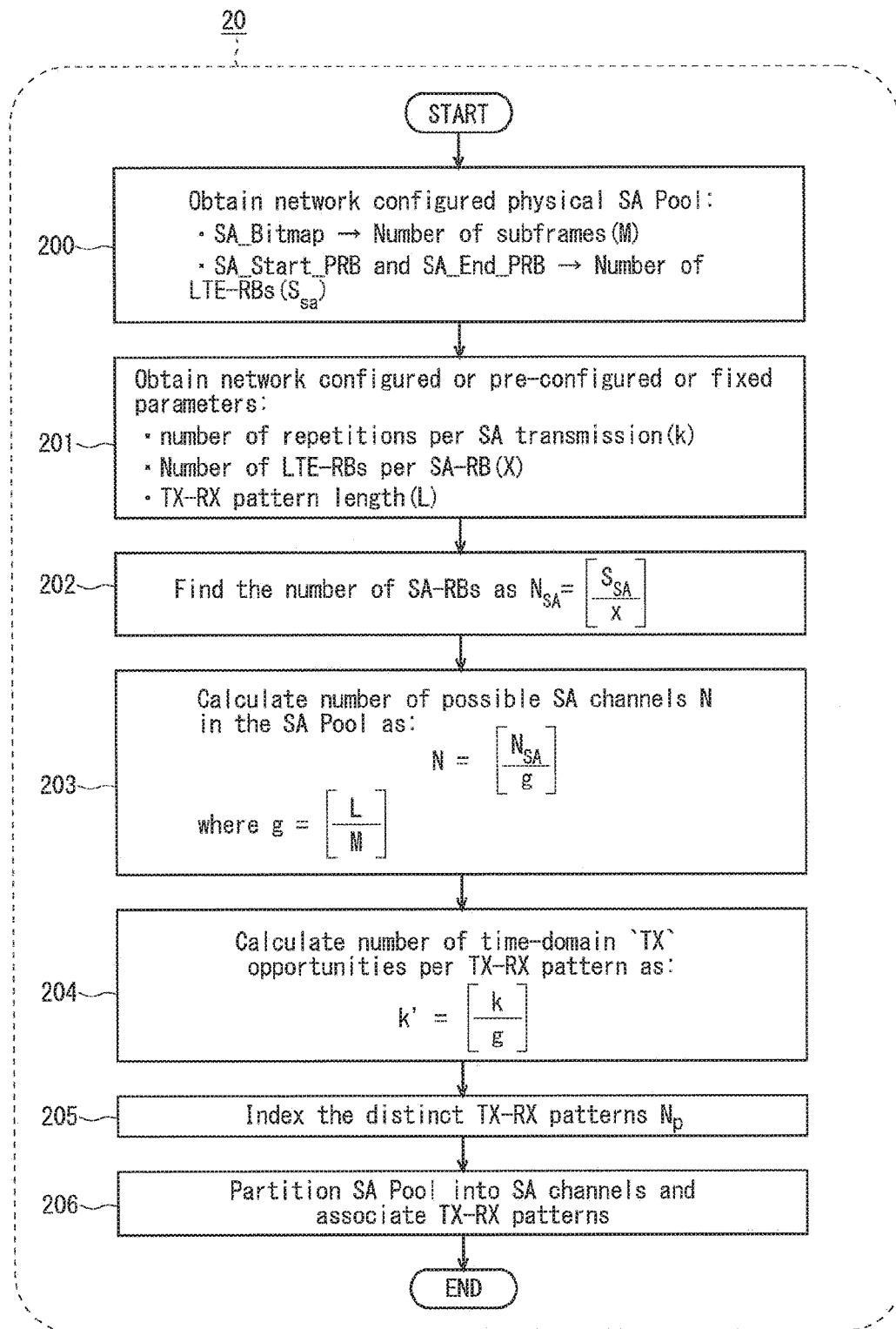
FIG. 3A illustrates a method 20 of partitioning a SA Pool into SA channels, according to an embodiment of the present invention.
Figure 3B:
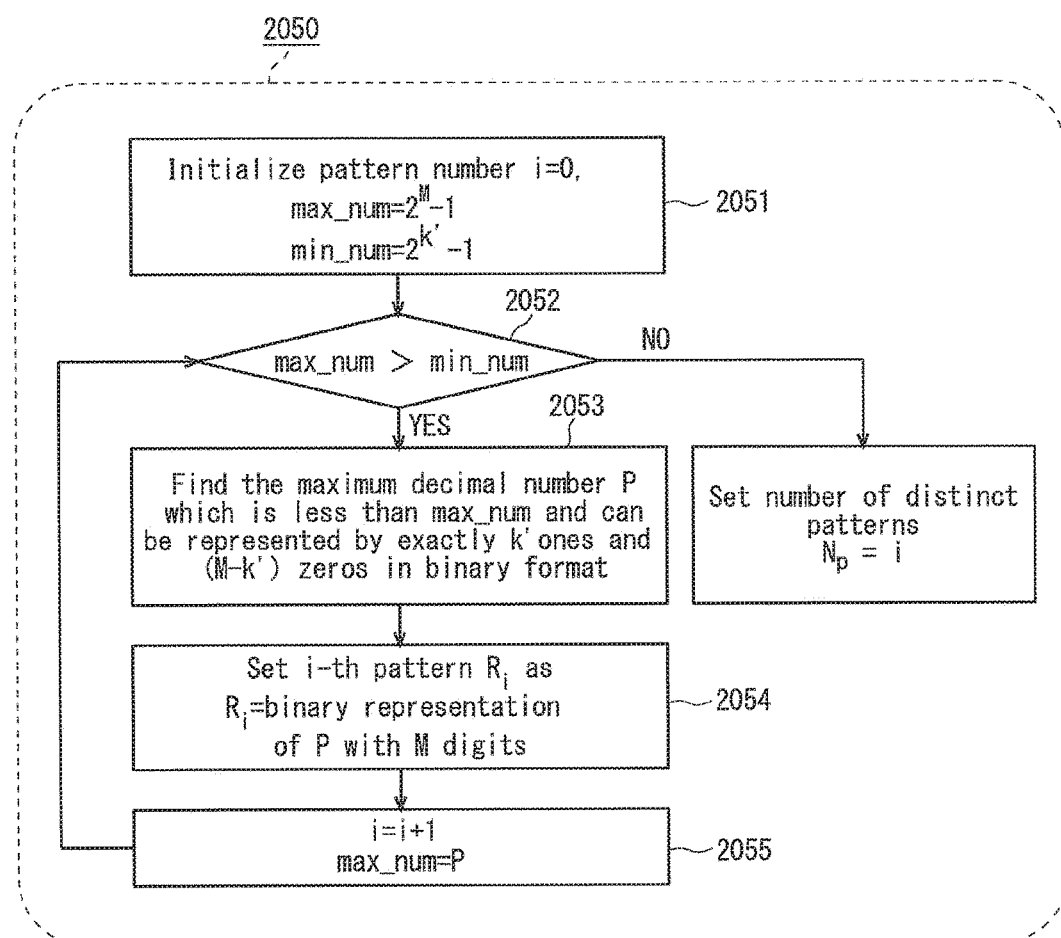
FIG. 3B illustrates a method 20 of partitioning a SA Pool into SA channels, according to an embodiment of the present invention.
Figure 3C:
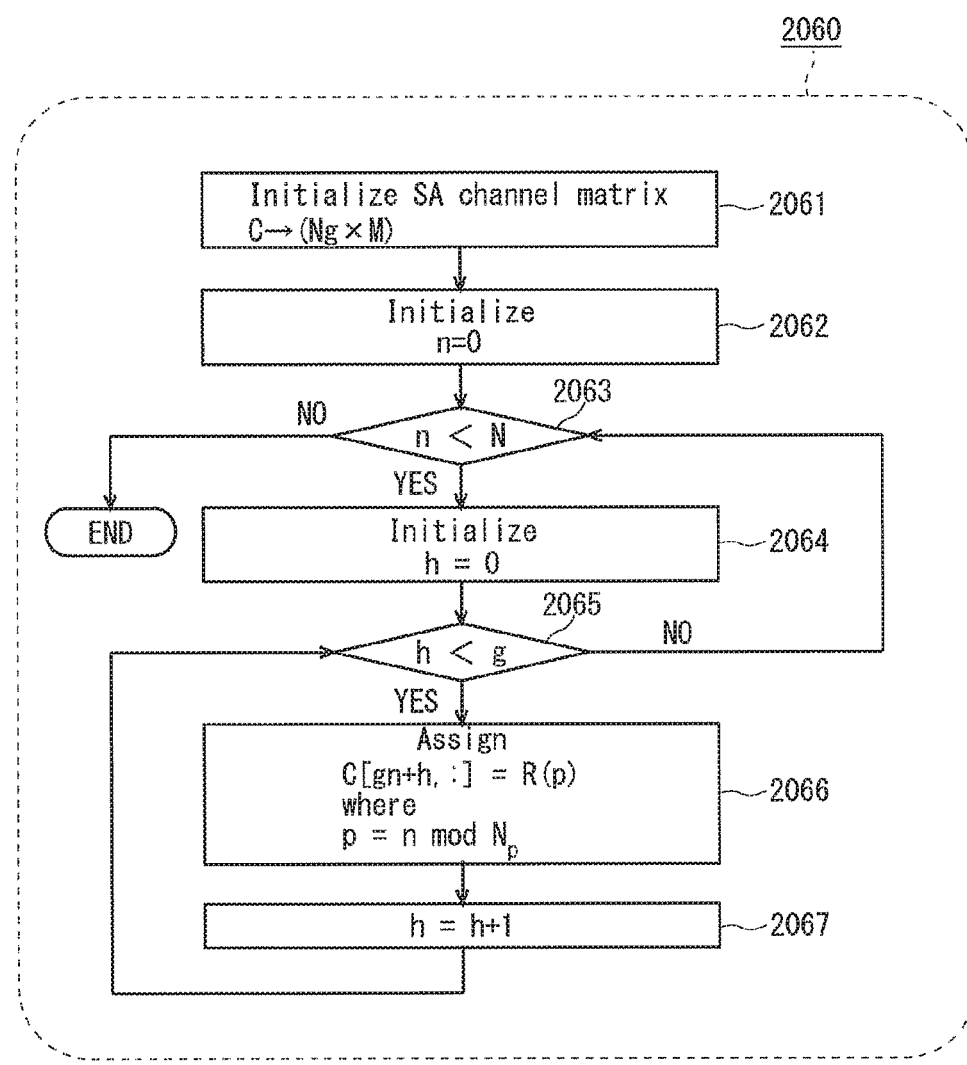
FIG. 3C illustrates a method 20 of partitioning a SA Pool into SA channels, according to an embodiment of the present invention.

FIGS. 3A, 3B and 3C illustrate a method 20 of partitioning a SA Pool into SA channels, according to an embodiment of the present invention.

At step 200, details of a network configured physical SA Pool are determined. In particular, a number of subframes M in the time-domain are determined from an SA_Bitmap, and a number of LTE-RBs $S_{SA}$ in the frequency-domain are determined from SA_Start_PRB and SA_End_PRB parameters.

At step 201, network configured, pre-configured or fixed parameters are obtained, including a number of repetitions per SA transmission (k), a number of LTE-RBs per SA-RB (x) and a TX-RX pattern length (L).

At step 202, a number of SA-RBs in the configured SA Pool are determined $$N_{SA} = \left\lfloor \frac{S_{SA}}{x} \right\rfloor,$$

as where $\lfloor \ \rfloor$ represents a round-down (floor) operation.

At step 203, a number of possible SA channels (N) in the configured SA Pool is determined as $$N = \left\lfloor \frac{N_{SA}}{g} \right\rfloor, \text{ where } g = \left\lceil \frac{L}{M} \right\rceil$$

is the number of pattern repetitions per SA channel in the frequency domain or number of SA-RBs per SA channel. The notation $\lceil \ \rceil$ represents the round-up (ceiling) operation.

At step 204, a number of time-domain 'TX' opportunities per TX-RX pattern k' is determined as $$k' = \left\lceil \frac{k}{g} \right\rceil.$$

At step 205, a number of distinct TX-RX patterns $N_p$ are determined and indexed. Step 205 is further illustrated with reference to sub-method 2050.

At step 2051, the parameters pattern number i=0, max_num=$2^M-1$ and min_num=$2_{k'}-1$ are initialised.

The following operations are then performed:
WHILE max_num>min_num (at block 2052):

At step 2053, the maximum decimal number P which is less than max_num and which can be represented by exactly k' ones and M-k' zeros in binary format is determined.

At step 2054, the i-th pattern Ri is set as the binary representation of P with M digits.

At step 2055, i is incremented by one and max_num is assigned the value P.

The number of distinct SA patterns $N_p$ is set to $N_p$=i.

At step 206, the SA Pool is partitioned into SA channels, and each determined TX-RX patterns is associated with an SA channel. Step 205 is further illustrated with reference to sub-method 2060.

At step 2061, the SA channel matrix is initialised as C→(Ng×M), and at step 2062 the channel index is initialised as n=0.

The following operations are then performed:
WHILE n<N (at block 2063):

At step 2064, h is initialised as h=0
WHILE h<g (at block 2065):

At step 2066, the p-th TX-RX pattern is assigned to the "gn+h"-th row of matrix C, where p=n mod Np.

At step 2067, h is incremented by one.

According to certain embodiments of the present invention, a method to index TX-RX patterns and to associate the transmission patterns to SA channels is providing with reference to pseudo-code below:

For a network configured SA pool size in number of subframes M and number of LTE-RBs $S_{SA}$, a network configured, pre-configured or fixed parameters number of repetitions per SA transmission k, a number of LTE-RBs per SA-RB x and a TX-RX pattern length L:

1) Find the number of SA-RBs as:

$$N_{SA} = \left\lfloor \frac{S_{SA}}{x} \right\rfloor$$

2) Calculate number of possible SA channels in the SA Pool, N, as:

$$N = \left\lfloor \frac{N_{SA}}{g} \right\rfloor \text{ where } g = \left\lceil \frac{L}{M} \right\rceil$$

is the SA-RBs per SA channel in the frequency domain, and ⌈ ⌉ represents round-up operation and ⌊ ⌋ represents round-down operation 3) Calculate number of time-domain 'TX' opportunities per TX-RX pattern as $$k' = \left\lceil \frac{k}{g} \right\rceil$$

4) Find number of distinct TX-RX patterns, $N_p$ and index them as:
   a) Initialize max_num=$2^M-1$
   b) Initialize min_num=$2^{k'}-1$
   c) Initialize pattern number i=0
   d) Perform following operations WHILE max_num>min_num
      i. Find maximum decimal number P which is less than max_num and can be represented by exactly k' ones and (M-k') zeros in binary format
      ii. Assign i-th TX-RX pattern R(i)=Binary representation of P with M digits
      iii. Increment i by 1
      iv. Assign max_num=P
   e) Assign number of distinct TX-RX patterns $N_p$=i 5) Partition SA Pool into N SA channels associate TX-RX patterns to each channel as:
   a) Initialize SA channel matrix C of size (N·g·M)
   b) Initialise SA channel index n=0
   c) WHILE n<M
   i) Initialise h=0
   ii) WHILE h<g
      1. Assign C[gn+h,:]=R(p) where p=n Mod $N_p$
      2. Increment h by 1

FIGS. 4A to 4D illustrate exemplary scenarios of SA pattern indexing and association of SA patterns to SA channels, according to embodiments of the present invention.

FIG. 4A illustrates an exemplary scenario 30, where $N_{SA}$=15, M=6, k=4 and L=M=6. In this scenario, the number of SA-RBs per SA channel (g) is one and the number of SA channels (N) is equal to the number of distinct TX-RX patterns possible for given M and k.

Figure 4B:
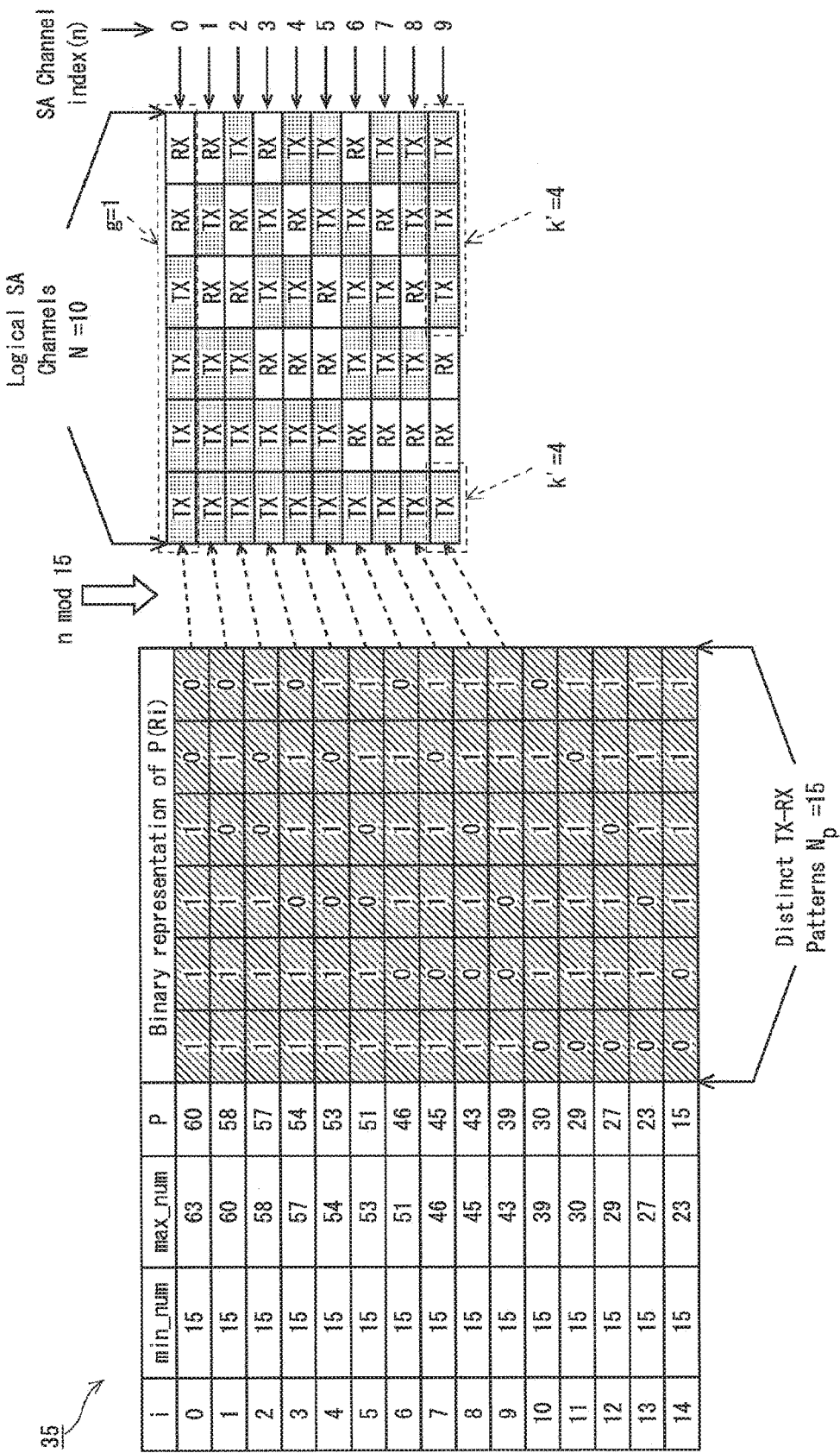
FIG. 4B illustrates exemplary scenarios of SA pattern indexing and association of SA patterns to SA channels, according to embodiments of the present invention.

FIG. 4B illustrates an exemplary scenario 35, where M=6, k=4 and L=M=6, as was the case for scenario 30, but with $N_{SA}$=10, which is less than the number of distinct TX-RX patterns possible for M and k.

Figure 4C:
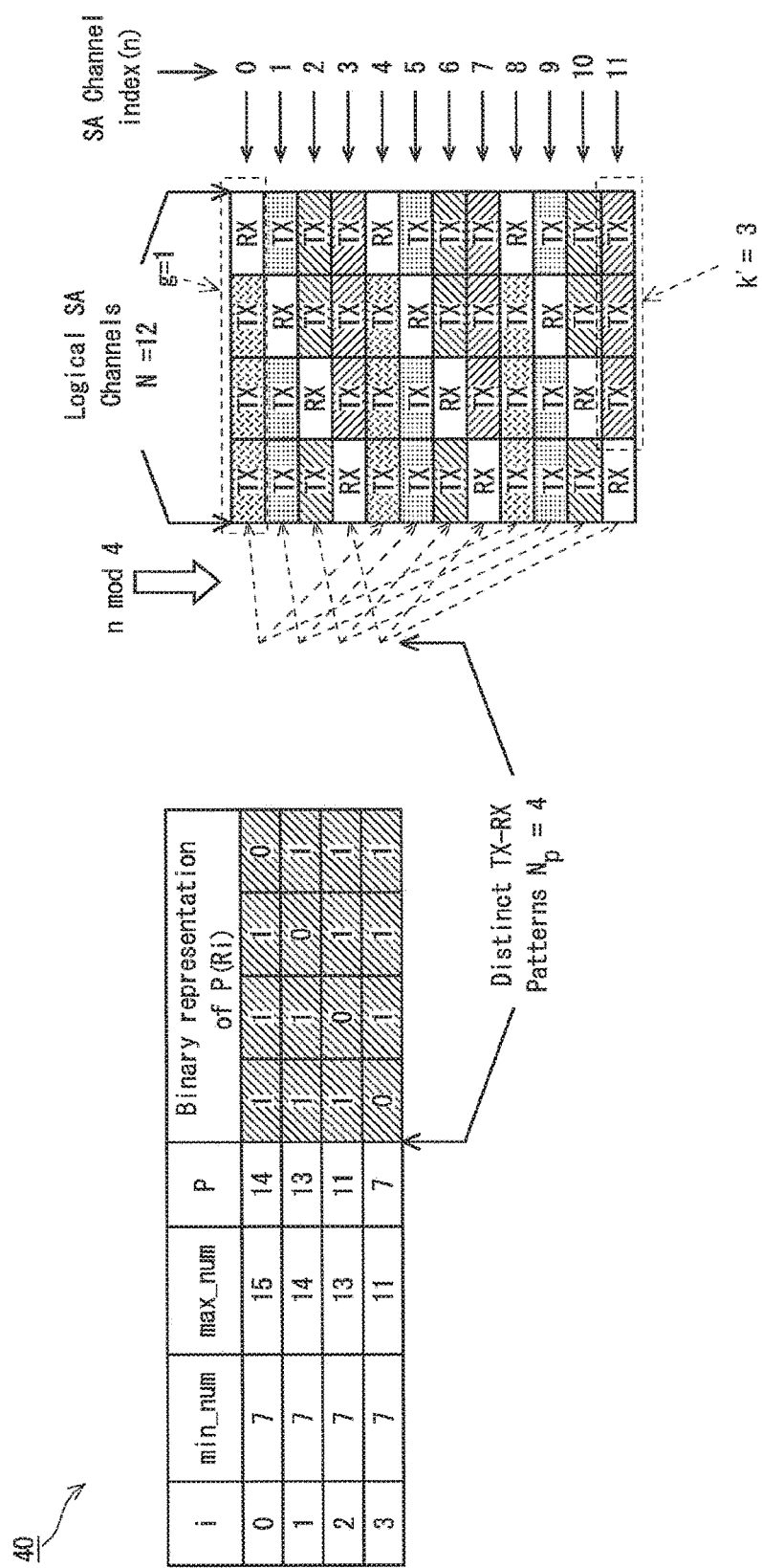
FIG. 4C illustrates exemplary scenarios of SA pattern indexing and association of SA patterns to SA channels, according to embodiments of the present invention.

FIG. 4C illustrates an exemplary scenario 40, where $N_{SA}$=12, M=4, k=3 and L=M=4. In this scenario, the number of SA channels (N) is larger than the number of distinct TX-RX patterns possible for M and k.

Figure 4D:
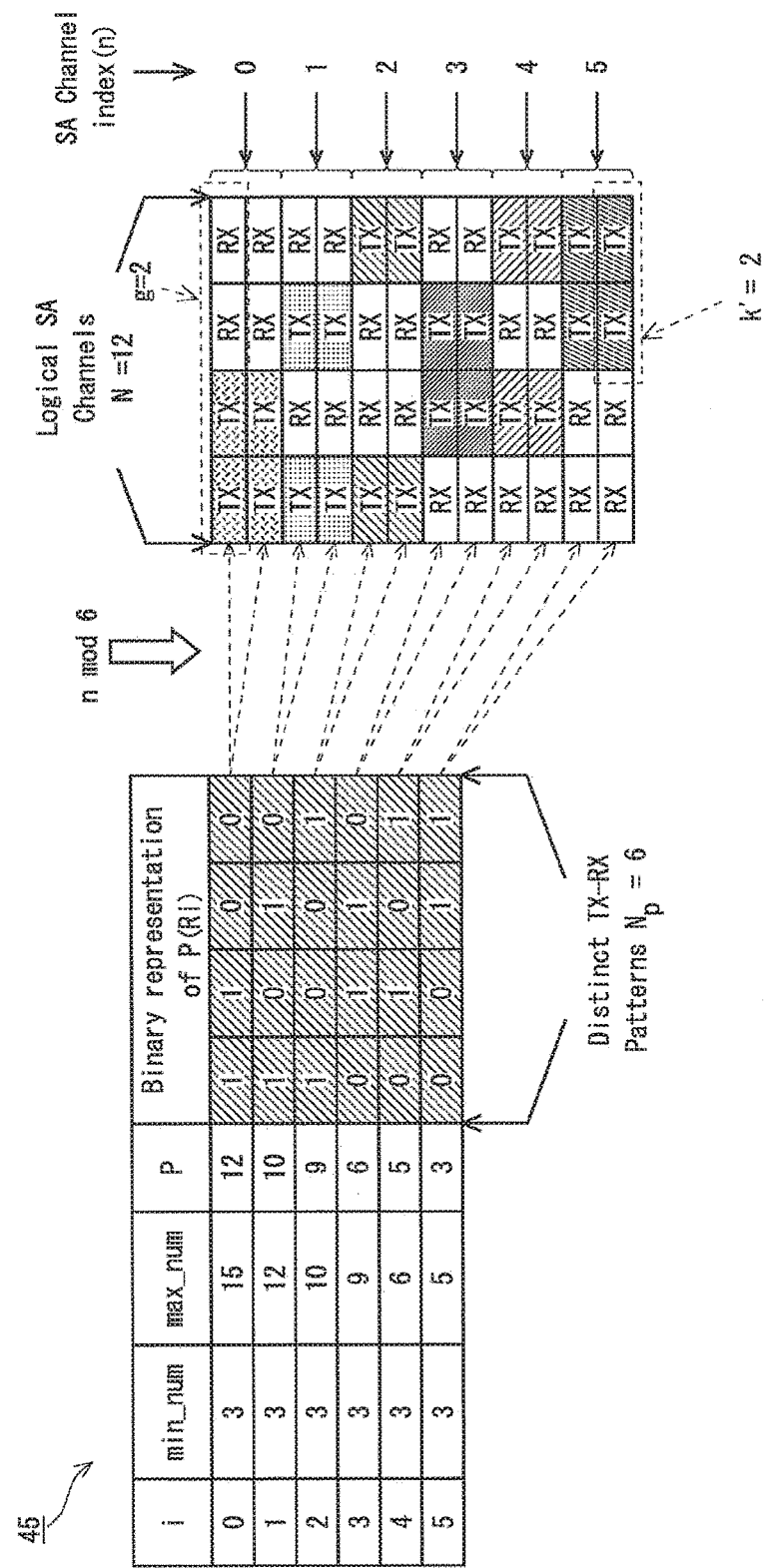
FIG. 4D illustrates exemplary scenarios of SA pattern indexing and association of SA patterns to SA channels, according to embodiments of the present invention.

FIG. 4D illustrates yet another exemplary scenario 45, where the SA channel length (L) is larger than the number of time units/subframes in the SA pool (M). In this scenario, one SA channel may occupy two SA-RBs (g=2) to accommodate the required number of repetitions (k).

In order to establish the multiple uniquely identified TX-RX patterns illustrated above with reference to FIGS. 4A to 4D, the following pre-configured or network configured parameters can be used:

a) 'TX-RX pattern length': L. This value may be greater than or equal to the number of subframes in the configured Pool. This serves the situation where an eNodeB does not have enough resources to accommodate all repetitions in time-multiplexed manner by having allowing frequency multiplexed repetition; and b) Number of repetition or transmission opportunity within L: k.

The pre-configured or network configured resource pool is partitioned into channels where each partitioned channel is uniquely indexed and has unique time-domain transmission patterns (TX-RX patterns) providing transparent TX and RX opportunities across all available channels. The set of TX-RX patterns have the property that at least one 'TX' opportunity of a given TX-RX pattern aligns with at least one 'RX' opportunity of the remaining transmission patterns to reduce half-duplex constraint and in-band emission. Further, the transparency of both TX and RX opportunities across all channels may facilitate the addition of advanced features such as pre-emption access.

After generating the SA channel matrix/table (C) using the method 20 in FIGS. 3A, 3B and 3C or the pseudo-code described above, the D2D-UE may obtain the TX-RX pattern of the i-th channel by accessing the gi-th row of the matrix/table C and interpreting '1' as a 'TX' opportunity and '0' as an 'RX' opportunity.

According to certain embodiments of the present invention, a method derive the TX-RX pattern of the i-th channel is providing with reference to pseudo-code below:

For network configured number of SA Pool subframes M, calculated number of 'TX' opportunities per TX-RX pattern k', number of distinct TX-RX patterns Np and SA channel index i:
1) Initialize h=0
2) Initialize max_num=$2^M-1$
3) Initialize min_num=$2^{k'}-1$
4) Perform following operations WHILE h≤i mod $N_p$
   a) Initialise temp=max_num
   b) Initialize y=0
   c) perform following operations WHILE y=0
     i) decrease temp by 1
     ii) Assign B=binary representation of temp with M digits
     iii) IF B has exactly k' ones and (M−k') zeros:
       1. Assign y=1
   d) Assign max_num=temp
   e) Increment h by 1
5) Assign i-th pattern=B
6) Interpret '1' as 'TX' and '0' as 'RX' in the pattern given by B Another embodiment of the present invention utilises the SA Pool structure, associated TX-RX patterns and transparency of TX-RX opportunities across all SA channels, discussed above, as well as the one-to-one association of SA Pool and Data Pool, to perform D2D broadcast communication either by transmitting single TB (and repetitions) per D2D_Communication_Period or by transmitting multiple TBs (and repetitions) per D2D_Communication_Period.

In one embodiment, single TB transmission may include contention for transmitting a scheduling assignment (SA) in a SA Pool, providing layer-1 control information for the reception of a single TB (and its repetitions) transmission in the corresponding Data Pool.

A D2D-UE that transmits single TB may perform following operations.

The D2D-UE may randomly select a SA channel index out of all SA channel indices (0 to N−1) in a network configured or pre-configured SA Pool. Alternatively, a SA channel index may be derived using D2D-UE specific identification.

The D2D-UE may then derive the TX-RX pattern associated with the selected SA channel. This may be implemented by a lookup table that defines the TX-RX patterns of all SA channels in the D2D_Communication_Period or by following a process similar to that described above.

The D2D-UE may transmit the first version of the SA on the SA-RB that corresponds to the first 'TX' opportunity indicated by the TX-RX pattern of the selected SA channel.

The D2D-UE may transmit repeated versions of the same SA on the SA-RBs that correspond to subsequent 'TX' opportunities of the selected SA channel.

SA-RBs for the repeated SA transmission may be determined according to an SA-RB hopping pattern.

The SA-RB hopping pattern may provide the SA-RB $SA\_RB_{n,h}^t$ that maps the h-th SA-RB (0≤h<g) of the n-th SA channel (0≤n<N) at the t-th opportunity of the TX-RX pattern (0≤t<M) as:

$$SA\_BR_{n,h}^t = [n + N \cdot h + p \cdot t] \bmod N_{SA}$$

where g is the number of SA-RBs per SA channel, N is the number of possible SA channels in the SA pool, M is the number of time units or subframes in the SA pool and p is the SA-RB shift which can be chosen based on the resource pool configuration as:

$$p = \begin{cases} \left\lfloor \frac{N}{M} \right\rfloor \times g & \text{for } g > 1 \\ \left\lfloor \frac{N_{SA}}{M} \right\rfloor \times 2 & \text{otherwise} \end{cases}$$

Then, the starting PRB of the h-th SA-RB (0≤h<g) of the n-th SA channel (0≤n<N) at the t-th opportunity of the TX-RX pattern (0≤t<M) can be obtained as:

$$Start\_PRB_{n,h}^t = SA\_Start\_PRB + SA\_RB_{n,h}^t \times x$$

where x is the number of LTE-RBs per SA-RB and SA_Start_PRB is the starting PRB number of the SA Pool configured by the network via D2D-SIB.

During the 'RX' opportunities on the selected SA channel, the D2D-UE monitors all or selected set of SA channels for SA transmissions from other D2D-UEs. This will include monitoring its selected SA channel for pre-emption requests from other D2D-UEs, which is described further below.

If the D2D-UE detects a pre-emption request on its selected SA channel during an 'RX' opportunity that occurs before its last 'TX' opportunity, the D2D-UE may choose to 'give-up' its associated data transmission in the corresponding data pool(s) and terminate incoming SA repetitions transmission.

If the D2D-UE selects to 'give-up', it will abandon its current transmission and re-attempt during the next coming D2D_Communication_Period. Furthermore, the D2D-UE may continue to listen to/monitor others SA transmissions during all remaining subframes of the SA Pool and continue to receive others data transmission in the Data Pool if the D2D-UE detected any intended SA during the SA Pool monitoring.

Otherwise, if the D2D-UE selects to 'continue', the D2D-UE may continue to transmit its SA until the next 'RX' opportunity occurs or until the end of the SA resource pool is reached.

If the D2D-UE does not decide to 'give-up' its transmission until the end of the SA Pool, it will continue to transmit its data TB on the 'TX' data resources corresponds to the selected SA channel during the associated Data Pool.

Figure 5A:
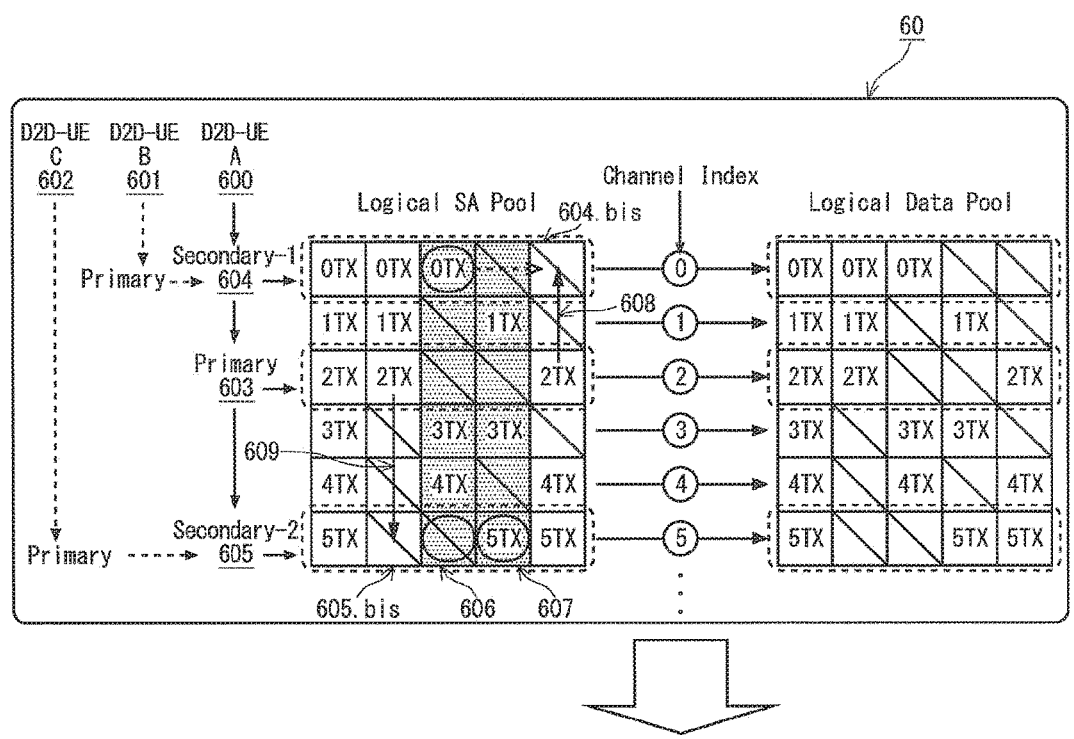
FIG. 5A illustrates a schematic illustrating multiple TB transmission during a D2D_Communication_Period, according to embodiments of the present invention.
Figure 5B:
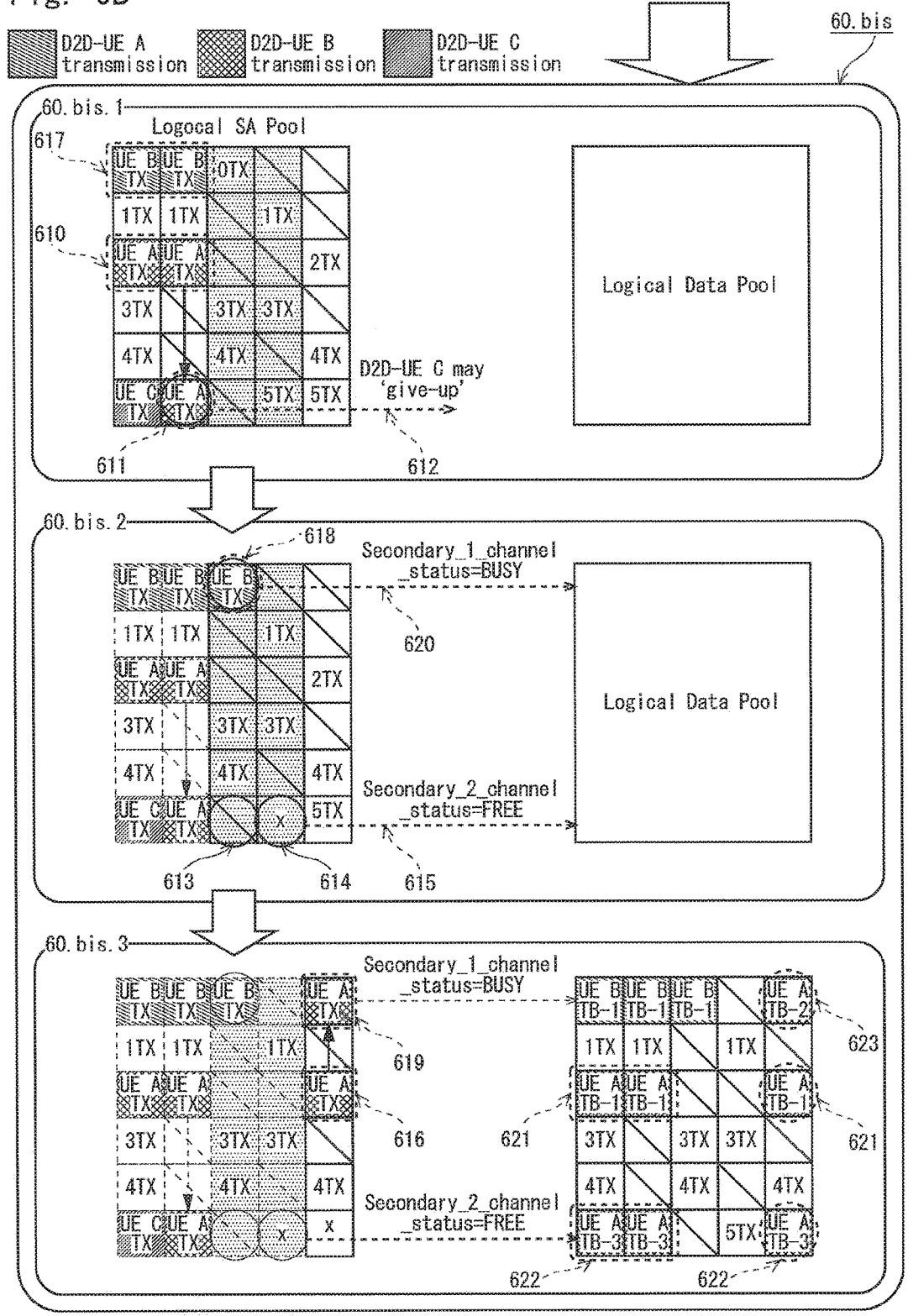
FIG. 5B illustrates a schematic illustrating multiple TB transmission during a D2D_Communication_Period, according to embodiments of the present invention.

According to certain embodiments, multiple TBs transmission may include transmitting a single SA (and repetitions) in an SA Pool that provides layer-1 control information for the reception of multiple associated TBs (and their repetitions) transmission in the corresponding Data Pool(s). FIGS. 5A and 5B illustrate a method of performing multiple TBs transmission using single SA, according to an embodiment of the present invention.

A D2D-UE (such as D2D-UE A 600 in schematic 60 of FIGS. 5A and 5B) who performs multiple TB transmission per D2D_Communication_Period may perform following operations:

Firstly, the D2D-UE (such as D2D-UE A, labelled as 600) may randomly select a primary SA channel index (603).

The D2D-UE (600) may utilise the selected primary SA channel (603) to transmit its full SA version, which contains scheduling information that points to the data PRB locations or data channels (i.e. primary data channel and secondary data channels) where multiple TBs are transmitted, as well as other layer-1 control information for the reception of those data channels/TBs.

Corresponding to the selected primary SA channel, there will be a unique data channel or data resources on which the said D2D-UE (600) may transmit its first data TB (TB-1). Moreover, there will be an associated TX-RX pattern that should be followed by the D2D-UE on the selected primary SA channel and the corresponding data channel. The D2D-UE (600) may always follow the TX-RX pattern of the selected primary channel during the SA and data Pool(s) of the D2D_Communication_Period.

Secondly, depending on the number of Data TBs that should be transmitted within the said D2D_ Communication_Period, the D2D-UE (600) may further randomly select 'Y' number of secondary SA channels' index (i.e. 604 and 605), excluding the already selected primary SA channel (i.e. 603), where maximum value of 'Y' is configured by the network or fixed in the specification.

Corresponding to the selected secondary SA channels (604 and 605), there will be unique data channels or data resources on which the said D2D-UE (600) intend to transmit its other data TBs (TB-y, 1<y<=Y+1). These secondary SA channels may also have unique TX-RX patterns that should be followed by a D2D-UE (such as D2D-UE B labelled as 601 and D2D-UE C labelled as 602) who selects these channels as their primary SA channels.

On each selected secondary SA channel (i.e. 604 and 605), the D2D-UE (600) may transmit a replicated version of the full SA on the SA-RB corresponds to the first 'RX' opportunity of the selected secondary SA channel that time-aligns with one of the primary channel's 'TX' opportunities (refer to 604.bis and 605.bis in schematic 60) to request or announce the occupancy of that secondary SA channels. This can be referred to as 'Pre-emption Request' transmission, and the Secondary channel's 'RX' opportunity at which the pre-emption request is transmitted is called 'pre-emption request opportunity'.

Thirdly, the D2D-UE (600) may derive the TX-RX patterns associated with the selected primary index and secondary SA channels' index. This may be implemented by referring to a lookup table that defines the TX-RX patterns of all channels in a SA Pool or by following a process similar to that described in the pseudo-code above, according to another aspect of the present invention.

Afterwards, the D2D-UE may find out whether the pre-emption request transmission on selected secondary channels happens before or after monitoring/listening (Pre-emption request before monitoring or Pre-emption request after monitoring) with respect to the selected primary channels TX-RX pattern. This can be done by comparing the TX-RX patterns of the selected secondary channels (i.e. 604 and 605) with that of the selected primary channel (603) as:

Represent the TX-RX patterns of primary (P) and secondary (S) channels in binary format by replacing 'TX' by '1' and 'RX' by '0'.

Perform the bit-wise binary addition (⊕) on the representations→(P⊕S)

Perform bit-wise 'AND' operation on the result with the representation of the primary pattern→(P⊕S)●(P)

Then, the left most position that has a '1' in (P⊕S)●(P) corresponds to the 'pre-emption request opportunity of the secondary channel represented by S.

Take the complement of primary pattern representation ($\overline{P}$)

IF decimal value of $\overline{P}$<decimal value of (P⊕S)●(P):
  Pre-emption request before monitoring Else IF decimal value of $\overline{P}$>decimal value of (P⊕S)●(P):
  Pre-emption request after monitoring With reference to the schematic 60 of FIGS. 5A and 5B, the D2D-UE A (600) has selected channel-2 As its primary channel (603), channel-0 as secondary-1 channel (604), and channel-5 as secondary-2 channel (605). According to the TX-RX patterns of the selected primary channel (604), the D2D-UE may monitor/listen to all SA channels or a selected set of SA channels during third time unit (606) and fourth time unit (607).

The TX-RX patterns of secondary-1 channel (604) and secondary-2 channel (605) reveal that the pre-emption request opportunity on the secondary-1 channel happens at the fifth time unit (608) while that on the secondary-2 channel happens at the second time unit (609) as these time units are the first 'RX' opportunities of the selected secondary channels that time-aligns with one of the primary channel's 'TX' opportunities. Thus, the D2D-UE may perform pre-emption request before monitoring on the secondary-2 channel (605) while performing pre-emption request after monitoring on the secondary-1 channel (604). Furthermore, according to the above method to compare TX-RX patterns, secondary-1 channel yields (P⊕S)●(P)=1 and $\overline{P}$=6, therefore $\overline{P}$>(P⊕S)●(P) and the pre-emption request is after monitoring while the secondary-2 channel yields (P⊕S)●(P)=8 and P=6, therefore $\overline{P}$<(P⊕S)●(P) which gives pre-emption request before monitoring.

When considering both secondary channels (604 and 605), the D2D-UE may perform at least one pre-emption request before monitoring in the scenario 60.

Then, during the SA Pool, the D2D-UE (600) may perform following operations (refer to the exemplary diagram 60.bis).

IF the D2D-UE has to transmit pre-emption request before monitoring

The D2D-UE (600) may (in 60.bis.1) transmit the full SA version at all 'TX' opportunities (610) before the 'RX' opportunity of the selected primary channel (603), and may transmit a replicated version of the full SA at the pre-emption request opportunity (611) of the selected secondary channel (605).

If there is a second D2D-UE (602) who has selected the said secondary channel (605) as its primary channel, this D2D-UE (602) may monitor its primary channel during the said pre-emption access opportunity (611). If the said second D2D-UE (602) detects the pre-emption request of the first D2D-UE (600), it may choose to 'give-up' (612) its transmission and may re-attempt during the next coming D2D_Communication_Period.

In 60.bis.2, during the first 'RX' opportunity (613) of the selected primary channel (603), the D2D-UE (600) may monitor its secondary channel (605) on which the pre-emption request was transmitted.

IF the D2D-UE (600) detects another transmission on the said secondary channel (605), the D2D-UE marks the status of that secondary channel as 'BUSY'. (secondary_ 2_ channel_status=BUSY).

Otherwise, the D2D-UE (600) marks the status of that secondary channel (605) as 'FREE' (615). (secondary_2 channel_status=FREE).

Referring again to 60.bis.2, IF there are any 'RX' opportunities (614) before the end of the SA_period, the D2D-UE (600) may perform the operations listed in above 1.2.

Referring to 60.bis.3, IF there are any 'TX' opportunities (616) before the end of the SA_period, the D2D-UE may transmit the full SA version on the selected primary channel (604) at those 'TX' opportunities.

IF the D2D-UE has to transmit pre-emption request after monitoring

The D2D-UE (600) may transmit the full SA version at all 'TX' opportunities (617 of 60.bis.1 and 618 of 60.bis.2), that occur before the pre-emption access opportunity (619 of 60.bis.3) of the selected secondary channel (604).

During the 'RX' opportunity/opportunities (613 and 614 of 60.bis.2) of the selected primary channel (603) that occur before the pre-emption opportunity (619) of the secondary channel (604), the D2D-UE may monitor the secondary channel (604) on which the pre-emption request has to be transmitted.

IF the D2D-UE (600) detects another transmission on the said secondary channel (604), the D2D-UE marks the status of that secondary channel as 'BUSY' (620). (secondary_1_channel_status=BUSY).

Otherwise, the D2D-UE (600) marks the status of that secondary channel (604) as 'FREE'. (secondary_1_channel_status=FREE).

Referring to 60.bis.3, during the pre-emption access opportunity (619) of the selected secondary channel (604), the D2D-UE (600) may transmit the full SA version on the primary channel (603) and the replicated version of the full SA on the secondary channel (604).

IF there are any other 'TX' opportunities before end of the SA_period, the D2D-UE may transmit the full SA version on the selected primary channel (604) at those 'TX' opportunities.

IF there are any other 'RX' opportunities before the end of the SA_period, the D2D-UE (600) may perform the operations listed in above 1.2.

During the upcoming Data period of the D2D_ Communication_Period (referring to 60.bis.3):

The D2D-UE (600) may transmit its first data TB (TB-1) on the 'TX' data resources (621) corresponds to the primary SA channel.

IF the secondary SA channel(s) (604 and 605) is (are) detected to be 'FREE' (615 in 60.bis.2) (secondary_X_channel_status=FREE), the said D2D-UE (600) may transmit corresponding data TBs (TB-y, y=2, 3, . . . , Y+1) on the data resources (622) corresponds to the secondary SA channel those time align with the 'TX' data resources corresponds to the primary SA channel.

IF the secondary SA channel(s) (604 and 605) is (are) detected to be 'BUSY' (620 in 60.bis.2) (secondary_X_channel_status=BUSY), the said D2D-UE may transmit corresponding secondary TBs (TB-y, y=2, 3, . . . , Y+1) on the data resource (623) corresponds to the secondary SA channels pre-emption access opportunity.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent Application No. 2014903048, filed on Aug. 6, 2014, the disclosure of which is incorporated herein in its entirety by reference.

The invention claimed is:

1. A method implemented in a device-to-device (D2D) user equipment (UE) used in a wireless communications system, the method comprising:
   receiving a network configured parameter;
   determining allowed time resource patterns for transmitting data on a UE-to-UE interface, based on the network configured parameter;
   determining an allowed time resource pattern from the allowed time resource patterns; and
   transmitting, in a first time period, information related to the allowed time resource pattern;
   wherein the allowed time resource pattern indicates a resource pattern in a second time period and corresponds to a bitmap,
   and each bit in the bitmap indicates whether or not a subframe is used for data transmission,
   wherein the first time period starts prior to the second time period used for data transmission and starts after an offset with respect to a starting point of LTE system frame.

2. The method of claim 1, wherein determining a channel for transmission of the information.

3. The method of claim 1, wherein a pool of subframes in the second time period comprises subframes of which each bit of a second bitmap indicates 1.

4. The method of claim 1, wherein the time resource patterns are determined according to a length of the bitmap.

5. A method implemented in a base station used in a wireless communications system, the method comprising:
   transmitting a network configured parameter;
   wherein allowed time resource patterns for transmitting data on a UE-to-UE interface is determined based on the network configured parameter,
   an allowed time resource pattern is determined from the allowed time resource patterns,
   the allowed time resource pattern indicates a resource pattern in a second time period and corresponds to a bitmap,
   and each bit in the bitmap indicates whether or not a subframe is used for data transmission,
   wherein the first time period starts prior to the second time period used for data transmission and starts after an offset with respect to a starting point of LTE system frame.

6. The method of claim 5, wherein the time resource patterns are determined according to a length of the bitmap.

7. A device-to-device (D2D) user equipment (UE) comprising a memory storing instructions and a processor configured to execute the instructions to:
   receive a network configured parameter;
   determine allowed time resource patterns for transmitting data on a UE-to-UE interface based on the network configured parameter,
   determining an allowed time resource pattern from the allowed time resource patterns; and
   transmitting, in a first time period, information related to the allowed time resource pattern;

wherein the allowed time resource pattern indicates a resource pattern in a second time period and corresponds to a bitmap, and each bit in bitmap indicates whether or not a subframe in a resource pool is used for the data transmission, wherein the first time period starts prior to the second time period used for data transmission and starts after an offset with respect to a starting point of LTE system frame.

8. The UE of claim 7, wherein determining a channel for transmission of the information.

9. The UE of claim 7, wherein a pool of subframes in the second time period comprises subframes of which each bit of a second bitmap indicates 1.

10. The UE of claim 7, wherein the time resource patterns are determined according to a length of the bitmap.

* * * * *